United States Patent
Walter et al.

(10) Patent No.: US 11,834,151 B2
(45) Date of Patent: Dec. 5, 2023

(54) SYSTEM FOR CONFIGURING AN AIRCRAFT IN A SINGLE-PILOT MODE OR A TWO-PILOT MODE

(71) Applicants: SAFRAN ELECTRONICS & DEFENSE, Paris (FR); ST ENGINEERING AEROSPACE Ltd, Singapore (SG)

(72) Inventors: Eric Walter, Paris (FR); Loïc Fougeres, Paris (FR); Mikaël Diaz, Paris (FR); Philippe Tranie, Paris (FR); Ng Kwee Chye, Singapore (SG); Tay Siew Liong, Singapore (SG)

(73) Assignees: SAFRAN ELECTRONICS & DEFENSE, Boulogne-Billancourt (FR); ST ENGINEERING AEROSPACE LTD, Singapore (SG)

( * ) Notice: Subject to any disclaimer, the term of this patent is extended or adjusted under 35 U.S.C. 154(b) by 168 days.

(21) Appl. No.: 17/416,335

(22) PCT Filed: Dec. 19, 2019

(86) PCT No.: PCT/EP2019/086279
§ 371 (c)(1),
(2) Date: Jun. 18, 2021

(87) PCT Pub. No.: WO2020/127710
PCT Pub. Date: Jun. 25, 2020

(65) Prior Publication Data
US 2022/0063795 A1    Mar. 3, 2022

(30) Foreign Application Priority Data

Dec. 19, 2018 (FR) ..................................... 1873405
Feb. 6, 2019 (FR) ..................................... 1901190

(Continued)

(51) Int. Cl.
*B64C 13/12* (2006.01)

(52) U.S. Cl.
CPC ................................... *B64C 13/12* (2013.01)

(58) Field of Classification Search
CPC .................................................... B64C 13/12
See application file for complete search history.

(56) References Cited

U.S. PATENT DOCUMENTS

| 7,379,795 B2* | 5/2008 | Arnouse | ............ | B64D 45/0056 340/963 |
| 11,535,373 B2* | 12/2022 | Johnson | ............. | B64D 11/0606 |

(Continued)

FOREIGN PATENT DOCUMENTS

| EP | 0 186 965 A1 | 7/1986 |
| EP | 3 121 121 A1 | 1/2017 |

(Continued)

OTHER PUBLICATIONS

Barbara Peterson: "Two People in a Cockpit Isn't Enough: What We Need to Prevent Future Air Disasters", Apr. 1, 2015 (Apr. 1, 2015), XP055640744, Retrieved from the Internet: URL:https://www.popularmechanics.com/fligh t/a14871/germanwings-flight-9525-cockpit-safety-rules/[retrieved on Nov. 8, 2019 ] p. 2-p. 3.

(Continued)

*Primary Examiner* — Justin M Benedik
(74) *Attorney, Agent, or Firm* — Muncy, Geissler, Olds & Lowe

(57) ABSTRACT

A configuration system (80) arranged to configure an aircraft in a single-pilot mode and a two-pilot mode, comprising: acquisition means (84) and authentication means (83) arranged to acquire and authenticate a configuration order that defines the selected mode and controls the configuration system (80) to configure the aircraft in the selected mode;

(Continued)

first activation means (85) arranged to activate equipment dedicated to piloting by a single-pilot on board when the aircraft is configured in single-pilot mode, and to deactivate dedicated equipment when the aircraft is configured in two-pilot mode;

verification means (87) arranged to, when the aircraft is configured in the single-pilot mode, verify that single-pilot flight conditions are met and inform the sole pilot on board and a ground station of the results of these checks.

14 Claims, 8 Drawing Sheets

(30) Foreign Application Priority Data

| Feb. 6, 2019 | (FR) | 1901191 |
| Feb. 8, 2019 | (FR) | 1901254 |
| Feb. 11, 2019 | (FR) | 1901350 |

(56) References Cited

U.S. PATENT DOCUMENTS

| 2006/0025900 A1 | 2/2006 | Arnouse |
| 2009/0105891 A1* | 4/2009 | Jones ............... B64D 45/0031 |
| | | 701/2 |
| 2018/0290729 A1 | 10/2018 | Shavit |

FOREIGN PATENT DOCUMENTS

| GB | 2 084 349 A | 4/1982 |
| GB | 2 381 879 A | 5/2003 |
| WO | WO 2017/068570 A1 | 4/2017 |

OTHER PUBLICATIONS

Bilimoria Karl D. et al:"Conceptual framework for single pilot operations", Proceedings of the International Conference On Human-Computer Interaction in Aerospace, HCI-AERO '14, Jan. 1, 2014 (Jan. 1, 2014), pp. 1-8.

* cited by examiner

SYSTEM FOR CONFIGURING AN AIRCRAFT IN A SINGLE-PILOT MODE OR A TWO-PILOT MODE

The invention relates to the field of aircraft configuration systems in single-pilot or two-pilot mode.

BACKGROUND OF THE INVENTION

Modern airliners are generally operated by a crew of at least two pilots, including a captain and a co-pilot.

It is envisaged to pilot some of these airliners with only one pilot on board for very specific applications, and in particular to transport goods. It is planned to convert an Airbus A321 airliner into a cargo aircraft that can be piloted by a single pilot.

This reconfiguration of the passenger aircraft has many advantages.

By transforming a pre-existing airliner that has been flying for several years into a cargo aircraft, we have a proven, reliable cargo aircraft, without the need to finance a complete new aircraft development program. The profitability of the initial program is also improved with this new application.

Since a cargo plane does not carry passengers, unlike a commercial aircraft, reducing the number of pilots seems to be an easier first step for the general public to accept. Of course, it is not a question of accepting any reduction in flight safety, which must not be degraded but rather reinforced by this reconfiguration. Nor can an overload of work be accepted for the only pilot on board.

By reducing the number of pilots, the overall cost of each flight is reduced too.

In addition, a number of solutions have emerged to assist the pilot on board in his/her tasks, including improving safety through the ability to analyze a large amount of data in real time. Solutions also exist to assist the pilot on board when conditions in the cockpit are deteriorated, for example in the event of smoke being released in the cockpit.

The conversion of an aircraft designed to be piloted by two pilots on board to an aircraft that can be piloted by a single pilot on board requires, of course, the introduction into the aircraft of equipment dedicated to flight control by the single pilot on board.

To switch the aircraft from a configuration in which the aircraft must be piloted by two pilots on board to a configuration in which the aircraft can be piloted by a single pilot on board, the aircraft operator must therefore perform the following actions.

The operator must stop the aircraft. The operator then installs the equipment dedicated to flight control by a single pilot on board, and modifies the aircraft wiring to make this dedicated equipment operational. The operator follows the instructions contained in a "Service Bulletin" produced by the aircraft manufacturer or by a design organisation approved by the authorities. In the case of the European Aviation Safety Agency (EASA), approval requires the issuance of a DOA (Design Organisation Approval).

Similarly, if the operator wishes to change the aircraft from one pilot on board to two pilots on board, similar actions must be taken.

It is understood that these actions are constraining and require the aircraft to be stopped for a significant period of time.

It would therefore seem particularly advantageous for the aircraft operator to be able to simply and quickly switch the aircraft from the two-pilot on board configuration to the single-pilot on board configuration and vice versa. The operator would thus benefit from a high degree of flexibility in the use of the aircraft.

PURPOSE OF THE INVENTION

The purpose of the invention is to quickly and simply switch an aircraft from a configuration in which the aircraft is to be piloted by two pilots on board to a configuration in which the aircraft can be piloted by a single pilot on board, and vice versa.

SUMMARY OF THE INVENTION

To achieve this goal, a configuration system is proposed which is arranged to configure an aircraft in a mode selected from a plurality of modes including a single-pilot mode, in which the aircraft can be piloted by a single pilot on board, possibly supplemented by a ground pilot, and a two-pilot mode, in which the aircraft must be piloted by two pilots on board, the configuration system comprising:
  acquisition means and authentication means arranged respectively to acquire and then authenticate a configuration order that defines the selected mode and controls the configuration system to configure the aircraft in the selected mode;
  first activation means arranged to activate equipment dedicated to single-pilot flight when the aircraft is configured in single-pilot mode, and to deactivate dedicated equipment when the aircraft is configured in two-pilot mode;
  verification means arranged to, when the aircraft is configured in the single-pilot mode, verify that single-pilot flight conditions are met and inform the sole pilot on board and a ground station of the results of these checks, the flight conditions for a pilot including an operational state of the equipment dedicated to a flight by a single pilot on board.

Thus, when the acquisition means of the configuration system acquire a configuration order, the first activation means activate or deactivate the equipment dedicated to flight control by a single pilot to configure the aircraft according to the selected mode.

When the two-pilot mode is selected, the aircraft is piloted by a conventional crew with two pilots on board, in a manner identical to that of an unmodified aircraft.

When the single-pilot mode is selected, the aircraft can be piloted by a single pilot on board, possibly supplemented by a pilot on the ground. The means of verification shall ensure that specific conditions are met and, in particular, that the dedicated equipment, which assists the sole pilot on board in piloting the aircraft, is fully operational.

The configuration system according to the invention thus makes it possible to automatically and therefore simply and quickly switch from two-pilot mode to single-pilot mode and vice versa.

In addition, a configuration system such as the one described above is proposed, the configuration system also including second activation means arranged to prevent engine starting when the aircraft is configured in the single-pilot and not all single-pilot flight conditions are met.

In addition, a configuration system such as the one described above is proposed, in which single-pilot flight conditions also include an operational state of an aircraft data link to the ground station, and a validation by the ground station of the selection of the mode.

In addition, a configuration system such as the one described above is proposed, wherein the flight conditions also include confirmation that a flight plan programmed in the aircraft corresponds to a flight plan in the possession of a ground supervisor.

A configuration system such as the one just described is also proposed, wherein the authentication means are arranged to identify an author of the configuration order.

In addition, a configuration system such as the one described above is proposed, wherein the authentication means include a reader arranged to read an identification hardware support in the possession of the author of the configuration order and/or a password entered by the author of the configuration order and/or biometric data of the author of the configuration order.

In addition, a configuration system such as the one described above is proposed, wherein the authentication means include communication means arranged to establish a connection with a server on the ground to perform the authentication.

In addition, a configuration system such as the one described above is proposed, wherein the author of the configuration order is a maintenance technician who issues the configuration order during a maintenance phase wherein the aircraft is on the ground and the aircraft engines are shut down.

In addition, a configuration system such as the one described above is proposed, wherein the author of the configuration order is the pilot(s) on board.

In addition, a configuration system such as the one described above is proposed, wherein the configuration system is arranged to configure the aircraft in the two-pilot mode when the configuration system acquires a first configuration order produced by a first pilot on board and defining the two-pilot mode as the selected mode, and a second configuration order produced by a second pilot on board and defining the two-pilot mode as the selected mode.

In addition, a configuration system such as the one described above is proposed, including a virtual co-pilot arranged to load into one or more aircraft computer(s) a first software package when the configuration system configures the aircraft in the single-pilot mode, and a second software package when the configuration system configures the aircraft in the two-pilot mode.

In addition, an aircraft is proposed with original systems, integrated into the aircraft at the time of manufacture and arranged to allow the aircraft to be piloted by two pilots on board, the aircraft also including equipment dedicated to single pilot flight, and a configuration system as described above, with the dedicated equipment and the configuration system being introduced into the aircraft after manufacture.

A conversion method for a pre-existing aircraft originally designed to be piloted by two pilots on board is also proposed, including the steps of:
  integrating into the pre-existing aircraft equipment dedicated to single-pilot flight;
  integrating a configuration system into the aircraft as described.

In addition, a conversion method such as the one just mentioned is proposed, with the pre-existing aircraft having original systems including a flight control system with pilot controls positioned in the cockpit, dedicated equipment including a control device and an interface device to connect the control device and pilot controls to the original systems, the conversion method including the steps of:

when the aircraft is to be configured in the single-pilot mode, using the interface device to connect the pilot controls and the flight control device to the original systems;
  when the aircraft is to be configured in the two-pilot mode, replacing in the aircraft the first equipment of the interface device with second equipment that statically connects the pilot controls to the original systems.

The invention will be better understood when reading the following description of a particular non-restrictive embodiment of the invention.

BRIEF DESCRIPTION OF THE DRAWINGS

Reference is made to the appended drawings, wherein.

DETAILED DESCRIPTION OF THE INVENTION

Figure 1:
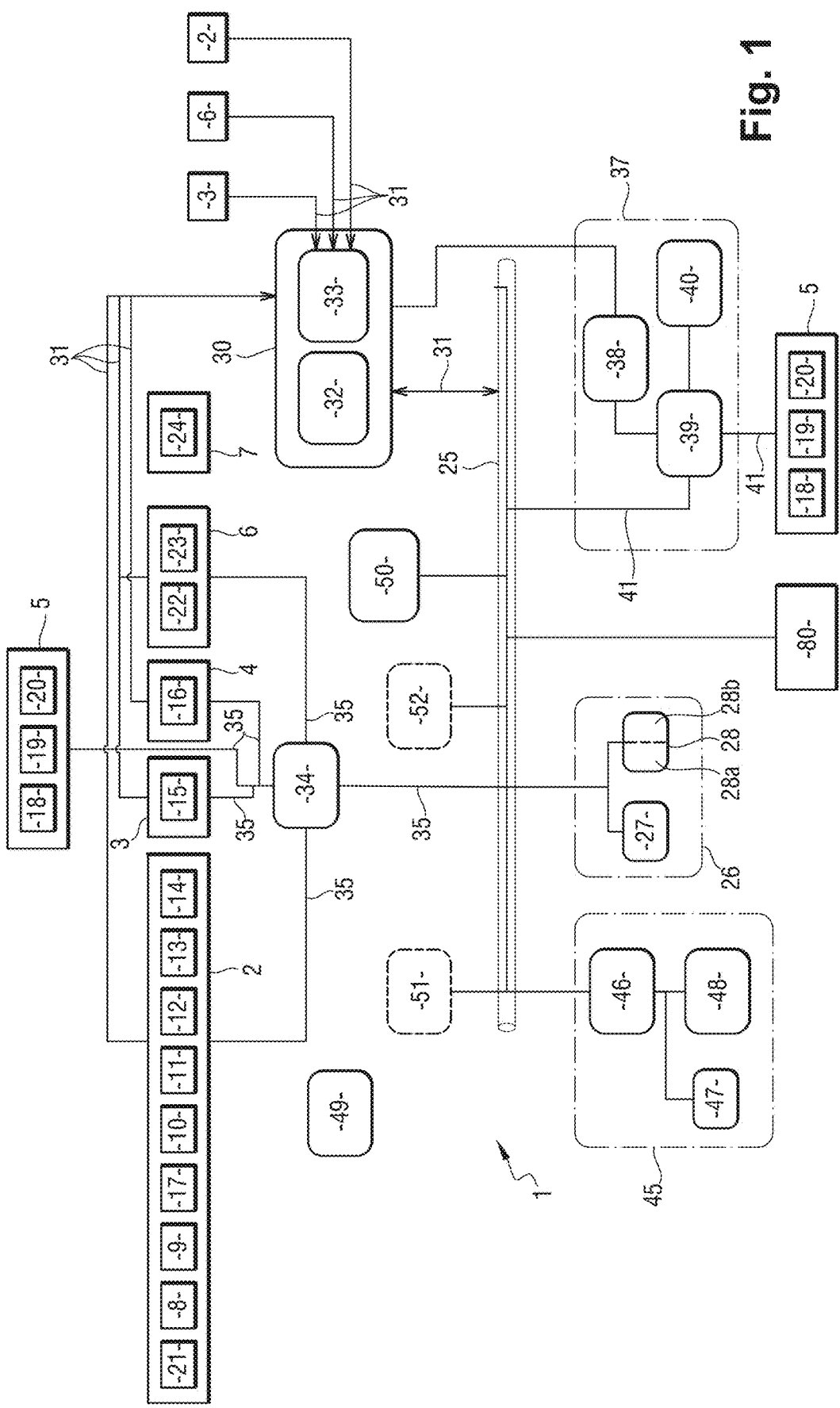
FIG. 1 represents an alternative piloting system including the configuration system according to the invention, as well as a plurality of original systems of a pre-existing aircraft.

With reference to FIG. 1, an alternative piloting system 1 is integrated into a pre-existing aircraft. "Pre-existing aircraft" means that, when the aircraft was designed, it was not intended to be equipped with the alternative piloting system 1. In other words, the aircraft, at the time of its design, does not have any specific interfaces for the integration of the alternative piloting system.

The aircraft is a commercial aircraft, normally intended to be piloted by two pilots on board, which is intended to be converted into a cargo aircraft that can be piloted by a single pilot on board. The alternative piloting system allows, in the absence of a human co-pilot, to provide accompaniment to the pilot on board. This support is provided by the alternative piloting system itself, but also by ground staff, and in particular by a ground supervisor and a ground pilot.

The alternative piloting system 1 is integrated into the aircraft so that it can be piloted by this single pilot on board while complying with the safety and security requirements applicable to a conventional cargo aircraft piloted by several pilots.

The aircraft includes a number of original systems, i.e. systems present at the time of the aircraft design.

These original systems include a flight control system 2, a landing gear system 3, a lighting system 4, a communication system 5, an automatic control system 6, a navigation system 7.

The original systems obviously include other systems that are not mentioned here.

All original systems include equipment that may be redundant or even tripled.

The flight control system 2 includes pilot controls, positioned in the cockpit and operable by the pilot on board, with a throttle lever 21, rudder pedals 8, trim control wheel 9, SSU (for Side-Stick Unit) type sleeves 17, or active mini sleeves.

The flight control system 2 also includes flight control computers including ELAC 10 (for Elevator Aileron Computer), SEC 11 (for Spoiler Elevator Computer), FAC 12 (for Flight Augmentation Computer), SFCC 13 (for Slat Flap Control Computer) and THS 14 (for Trimmable Horizontal Stabilizer) computer(s).

The landing gear system 3 includes a system for controlling the orientation of at least one landing gear wheel assembly, which controls the direction of the aircraft as it moves on the ground, and a braking system.

The landing gear system 3 includes a BSCU (Braking and Steering Control Unit) control unit 15.

The lighting system 4 includes headlights 16 and headlight control means.

The communication system 5 includes communication means in the VHF band 18 (Very High Frequency), means of communication in the HF band 19 (High Frequency), as well as means of communication by satellite 20 (SATCOM).

The automatic control system 6 consists of one or more FMGC 22 (for Flight Management Guidance Computer) and one or more FADEC 23 (for Full Authority Digital Engine Control) ECU(s).

The navigation system 7 includes one or more ADIRS system(s) 24 (for Air Data Inertial Reference System).

The alternative piloting system 1 interfaces with these original systems and with the original avionics, but is completely separate, distinct from these original systems and the original avionics.

"Separate" means that the original systems and original avionics, on the one hand, and the alternative piloting system 1, on the other hand, do not include any common equipment.

The separation is mechanical, software and hardware. Thus, a trouble or failure (caused for example by hacking) of the alternative piloting system 1 does not have a significant impact on the original systems and on the original avionics.

The alternative piloting system 1 consists of a plurality of devices and a main bus 25, which is here a data bus ARINC 664, on which commands and data can flow.

The different devices of the alternative piloting system 1 communicate with each other via the main bus 25.

All the devices of the alternative piloting system 1 are equipped with appropriate means of protection (firewall, virus control, etc.) to secure these communications.

The devices of the alternative piloting system 1 first of all include a control device 26. The control device 26 is only connected to the main bus 25.

The pilot system 26 is thus totally independent of the aircraft original systems and is therefore almost completely autonomous.

The pilot device 26 consists of a positioning unit 27 and a control unit 28 (or FSS, for Flight Stability System).

The positioning unit 27 includes an inertial measurement unit, a satellite positioning device (or GNSS, for Global Navigation Satellite System) comprising one or more antenna(s), and an anemobarometric control unit.

The positioning unit 27 produces aircraft positioning data. Positioning data includes aircraft location and orientation data.

The positioning unit 27 is independent and autonomous from the aircraft original positioning equipment, and is different in design. This introduces dissimilarities between the positioning unit 27 and the aircraft original positioning equipment, which in particular prevents a common mode failure from leading to a simultaneous failure of the aircraft original positioning equipment and the positioning unit 27.

The control unit 28 includes two dissimilar calculation channels 28*a*, 28*b*. This prevents a common mode failure from causing a simultaneous failure of both calculation channels 28*a*, 28*b* and therefore of the control unit 28.

Each calculation channel 28*a*, 28*b* has a COM/MON architecture and includes a control module and a monitoring module.

The control unit 28 ensures safe control during taxiing, take-off, cruise and landing phases when the aircraft is piloted by a single pilot on board.

The control unit 28 is thus arranged to produce an alternative piloting setpoint for the aircraft.

This alternative piloting setpoint is used to fly the aircraft when the aircraft is in a particular emergency situation that is part of a predefined list of emergency situations. The pre-defined list of emergency situations includes any failure occurring on the aircraft, such as a failure of an aircraft engine, a failure of the aircraft automatic control system 6, a failure of the pilot on board, a malicious act of the pilot on board, a situation in which the aircraft is heading towards a pre-defined restricted area, a loss of communication with the ground station when the aircraft is operated by the pilot on the ground present at a ground station.

The control unit 28 also hosts control laws in degraded mode.

Among the laws of degraded mode control is a law that addresses a pilot failure on board during the aircraft take-off. The failure of the pilot on board results, for example, from a sudden death of the pilot or from a physical or psychological incapacity of any kind occurring during the flight.

During the take-off of the aircraft, if the pilot on board has a failure, it is still possible to abort the take-off as long as the aircraft speed is below a specified speed V1. When the aircraft speed exceeds the determined speed V1, the take-off can no longer be rejected because the aircraft ground braking at high speed is too risky, and it is then compulsory to have the aircraft take off.

Between the time the aircraft exceeds the determined speed V1 and the time the aircraft exceeds a determined altitude, for example 200 feet, the pilot normally controls the aircraft in manual mode: the automatic control system 6 is not used during this particular phase.

Thus, when a pilot failure on board is detected during this period, which lasts a few seconds, typically six seconds, it is the alternative piloting system 1 that takes over from the pilot on board and manages the take-off. Then, the automatic flight control system 6 takes over from the alternative piloting system 1.

In the event of pilot's failure, the control unit 28 also houses emergency flight plans. Thus, if the pilot has a failure, the alternative piloting system 1 can direct the aircraft to an airport where it can land.

It is specified that, in the event of a pilot's failure, the alternative piloting system 1 is capable of controlling the aircraft, but it is not necessarily the pilot who flies the aircraft. For example, if the automatic flight control 6 is operational, it brings the aircraft to the emergency airport on the ground according to the pilot's instructions, and automatically lands the aircraft.

The control unit 28 can also produce the alternative piloting setpoint in such a way as to prevent the aircraft from entering predefined prohibited areas. The geographical coordinates of the predefined prohibited areas are stored in the control unit 28.

The alternative piloting setpoint allows the aircraft to follow a trajectory that no longer leads to an entry of the aircraft into predefined prohibited areas. A predefined prohibited area is for example an area with special infrastructure (e. g. a nuclear power plant), an area with a high population density, etc.

The control unit 28 continuously calculates the future trajectory of the aircraft using the positioning data generated by the positioning unit 27, and estimates whether the future trajectory interferes with a predefined prohibited area. In the event that the pilot is heading towards a predefined prohibited area for the purpose of voluntarily crashing the aircraft, the alternative piloting setpoint produced by the alternative flight system 1 is used to fly the aircraft and to prevent it from entering the predefined prohibited area. If necessary, the alternative piloting setpoint will cause the aircraft to crash in a depopulated area. This implements a geofencing function: the aircraft position is monitored in real time and, if it is heading towards a predefined prohibited area, its trajectory is actively controlled to prevent the aircraft from entering the predefined prohibited area.

The control unit 28 thus implements controlled crash guidance laws and a loss detection algorithm for the geographical prohibition function.

The alternative piloting system 1 also includes an acquisition and analysis device 30. The acquisition and analysis device 30 is connected to the main bus 25, but also to the flight control system 2, the landing gear system 3, the lighting system 4, the communication system 5, and the automatic control system 6, via secondary buses 31 which are here buses A429. The buses A429 are original, pre-existing buses in avionics.

The acquisition and analysis device according to the invention 30 consists of acquisition means 32 and analysis means 33.

The acquisition means 32 include a plurality of interfaces with the original systems and a plurality of interfaces with the main bus 25.

The acquisition means 32 acquire parameters including data generated by the aircraft original systems as well as positioning data and alternative piloting setpoint generated by the flight control device 26. The parameters also include the ground piloting setpoint.

Data generated by the aircraft original systems and acquired by the acquisition means 32 include aircraft position data, attitude data, parameters produced by the automatic flight control system 6, parameters produced by the flight control system 2, engine parameters, navigation data, failure data, etc.

The analysis means 33 of the acquisition and analysis system 30 carry out processing and analyses on all these parameters. The analysis means 33 detect possible inconsistencies between these parameters.

The analysis means 33 processes the parameters to transform them into aircraft parameters (sorting, formatting, etc.) that can be transmitted to the rest of the alternative piloting system 1, on the ground, etc.

The analysis means 33 also host state machines that support the pilot (cross checks, additional pilot actions), but also to initiate emergency procedures, or to authorize the taking into account of commands from the control system 26.

The analysis means 33 evaluate from these parameters the condition of the aircraft and the current flight phase. The condition of the aircraft may be a normal or abnormal condition.

The analysis means 33 implements a state machine to select, from the parameters, the state of the aircraft and the current flight phase, a piloting setpoint selected from a plurality of piloting setpoints including the manual piloting setpoint produced by the pilot on board via the pilot controls, a ground piloting setpoint produced by the co-pilot on the ground, an automatic piloting setpoint produced by the automatic control system, and the alternative piloting setpoint.

The analysis means 33 manage the flight plan modification instruction, which is defined either by the pilot on board or by the ground pilot. The analysis means manage the switching of the trajectory management to be followed, which is defined either by the pilot on board, or by the pilot on the ground, or by the original automatic control system, or by the alternative piloting system.

The alternative piloting system 1 also includes an interface device 34.

The interface device 34 is connected to the main bus 25, but also to the flight control system 2, the landing gear system 3, the lighting system 4, the communication system 5 and the automatic control system 6, via secondary buses 35 which are here buses A429.

The interface device 34 is connected, in particular, to the pilot controls of the flight control system 2 and to the flight control device 26.

The interface device 34 includes switch means including a very high integrity relay system.

The relays are controlled by the analysis means 33 of the acquisition and analysis device 30. When the analysis means 33 decides that the alternative piloting setpoint shall be used to fly the aircraft, the analysis means 33 produces a switch instruction to control the relays so that they connect an output of the flight control device 26 to the flight control system 2. Similarly, when the analysis means 33 decides that the ground piloting setpoint shall be used to fly the aircraft, the analysis means 33 shall control the relays to transmit the ground piloting setpoint received via the communication device 37, which will be described below, to the flight control system 2.

The interface device 34 performs the physical interface by activating the aircraft controls and emulates the aircraft controls: flight controls, landing gears, flaps, breakers, etc.

The interface device 34 allows instructions to be sent to the original ECUs as if they were sent by a pilot on board via the cockpit interfaces.

The alternative piloting system 1 also includes a communication device 37 which includes an SDM module 38 (for Secured Data Module), an ADT module 39 (for Air Data Terminal) and a C2link module 40.

These modules form the interface means with a remote flight control system, communication means with remote control, as well as data security means to ensure the integrity of the recorded information. Integrity is based in particular on the security of recorded data and orders according to the principles implemented in a Safety Checker.

The communication device 37 is connected to the main bus 25 via the ADT module 39, but also to the communication system 5 via secondary buses 41 which are here buses A429. The communication device 37 is connected to the acquisition and analysis device 30 by a serial link.

The communication device 37 allows remotely controlled operation on the aircraft. In particular, the communication device 37 makes it possible to establish communication with the ground, so that the alternative piloting system 1 can be controlled from the ground, or other systems (e. g. the automatic control system 6) can be controlled from the ground via the alternative piloting system 1. Thus, in the event of pilot's failure, for example, radio communications and control of aircraft trajectories can be managed from the ground.

The C2link module 40 is now described in greater details. The aircraft is connected to a ground station by a command and control system (system C2). The system C2 allows a ground pilot to fly the aircraft from the ground station, in which the ground pilot is positioned.

The system C2 implements data links through which data is exchanged between the aircraft and the ground station. The C2link module 40 manages data link communications for the aircraft.

This data includes ground piloting setpoints sent to the aircraft, as well as information (measurements, parameter estimates, etc.) sent by the aircraft to the ground station and used to produce ground piloting setpoints.

Data can be exchanged via a direct radio link (LOS link, for Line-of-Sight) or via an indirect radio link (BLOS link, for Beyond Line-of-Sight).

When the LOS link is implemented, data is exchanged directly between the aircraft and the ground station. The LOS link complies, for example, with FAA DO-362 or Eurocae WG105 standards.

The term BLOS refers to any link that is not a LOS link. Thus, when a BLOS link is implemented, data is exchanged between the aircraft and the ground station via one or more relay(s), including for example a satellite or a terrestrial communication network. Two separate BLOS links are used here, each using a separate SATCOM system: INMARSAT and IRIDIUM NEXT.

Figure 2:
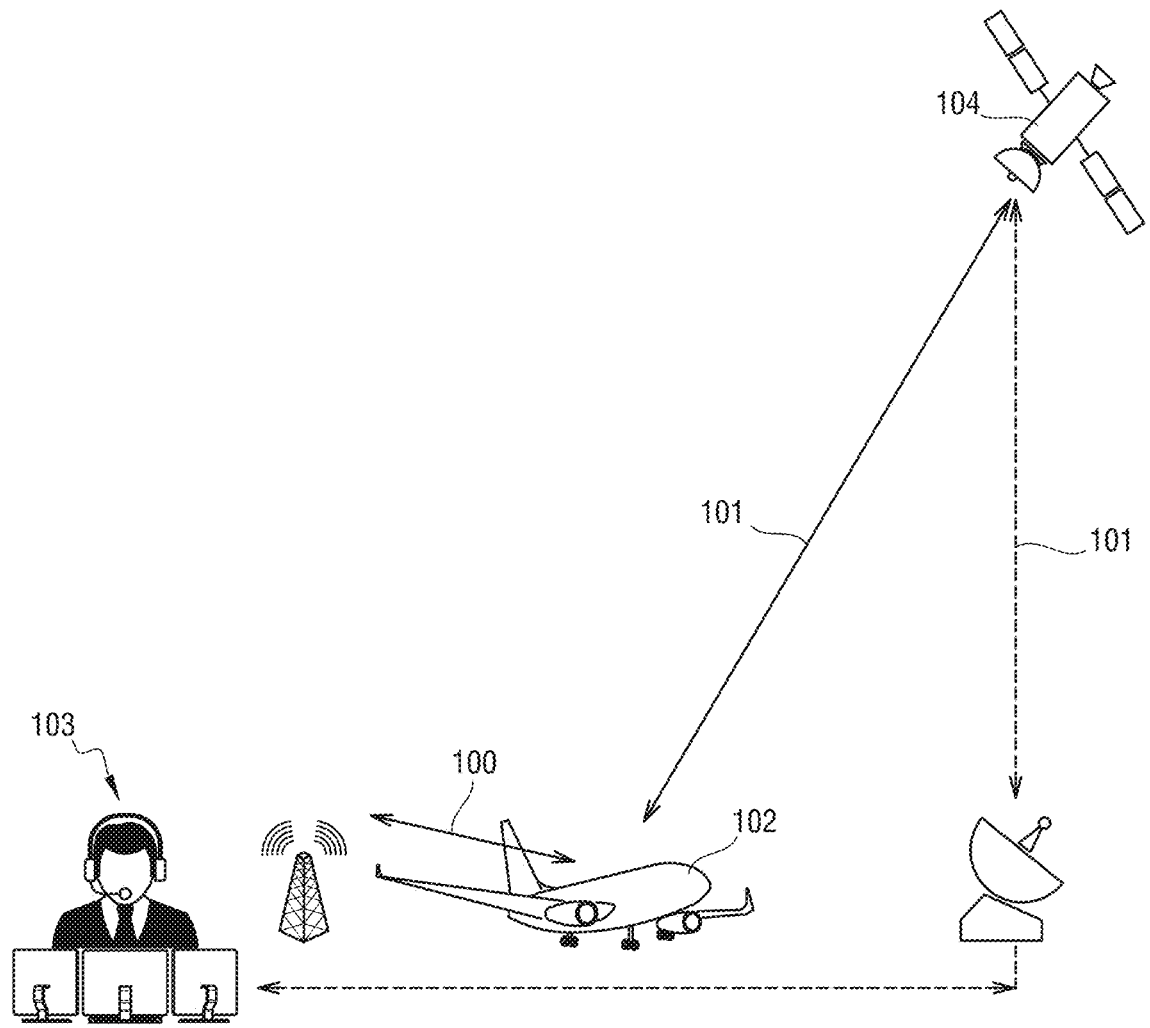
FIG. 2 represents, during the aircraft climb phase, a primary data link and a secondary data link of a system C2 that connects the aircraft and the ground, the primary data link being an LOS link and the secondary data link being a first BLOS link.

With reference to FIG. 2, during the (flight) phases of parking, taxiing to the take-off runway, take-off, and at the beginning of the climb phase, the LOS link 100 is a primary data link, used in nominal operation to transmit data, and the first BLOS link 101 is a secondary data link, used to redundant the LOS link 100 and to replace it in case of loss of the LOS link 100. The aircraft 102 and the ground station 103 communicate directly through the LOS link 100, and indirectly, through a first SATCOM system 104, through the first BLOS link 101.

During the climb phase, before the aircraft 102 reaches the range limit of the LOS link 100, a switch is made: the first BLOS link 101 becomes the primary data link and the LOS link 100 becomes the secondary data link. Alternatively, the second BLOS link can be used as a secondary link.

Figure 3:
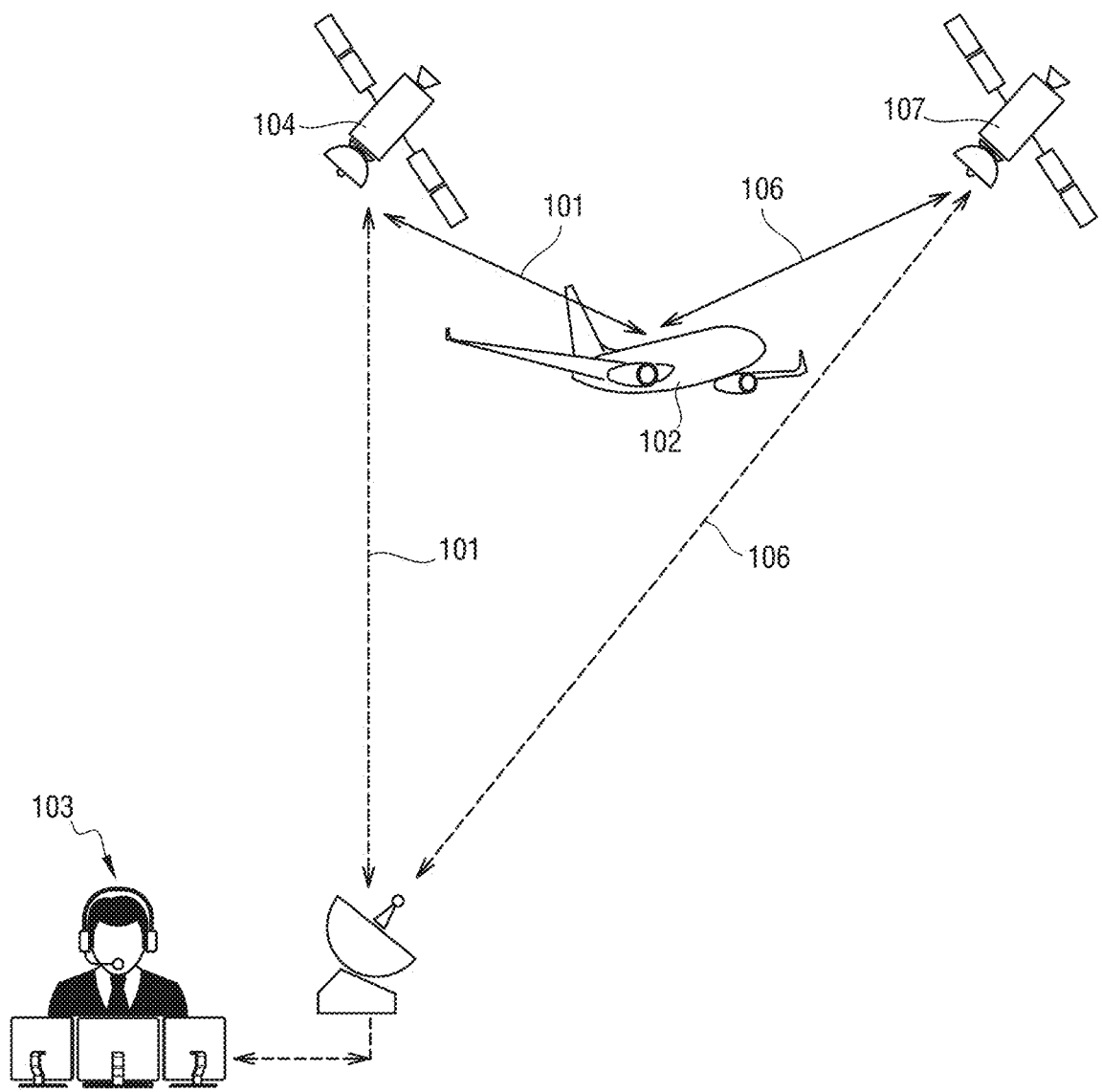
FIG. 3 represents, during the aircraft cruise phase, the primary and secondary data link of the system C2, the primary data link being the first BLOS link and the secondary data link being a second BLOS link.

Then, with reference to FIG. 3, at the end of the climb phase and during the cruise phase, the first BLOS link 101 is used as the primary data link and the second BLOS link 106 is used as the secondary data link (or vice versa). The second BLOS link 106 uses a second SATCOM system 107.

Figure 4:
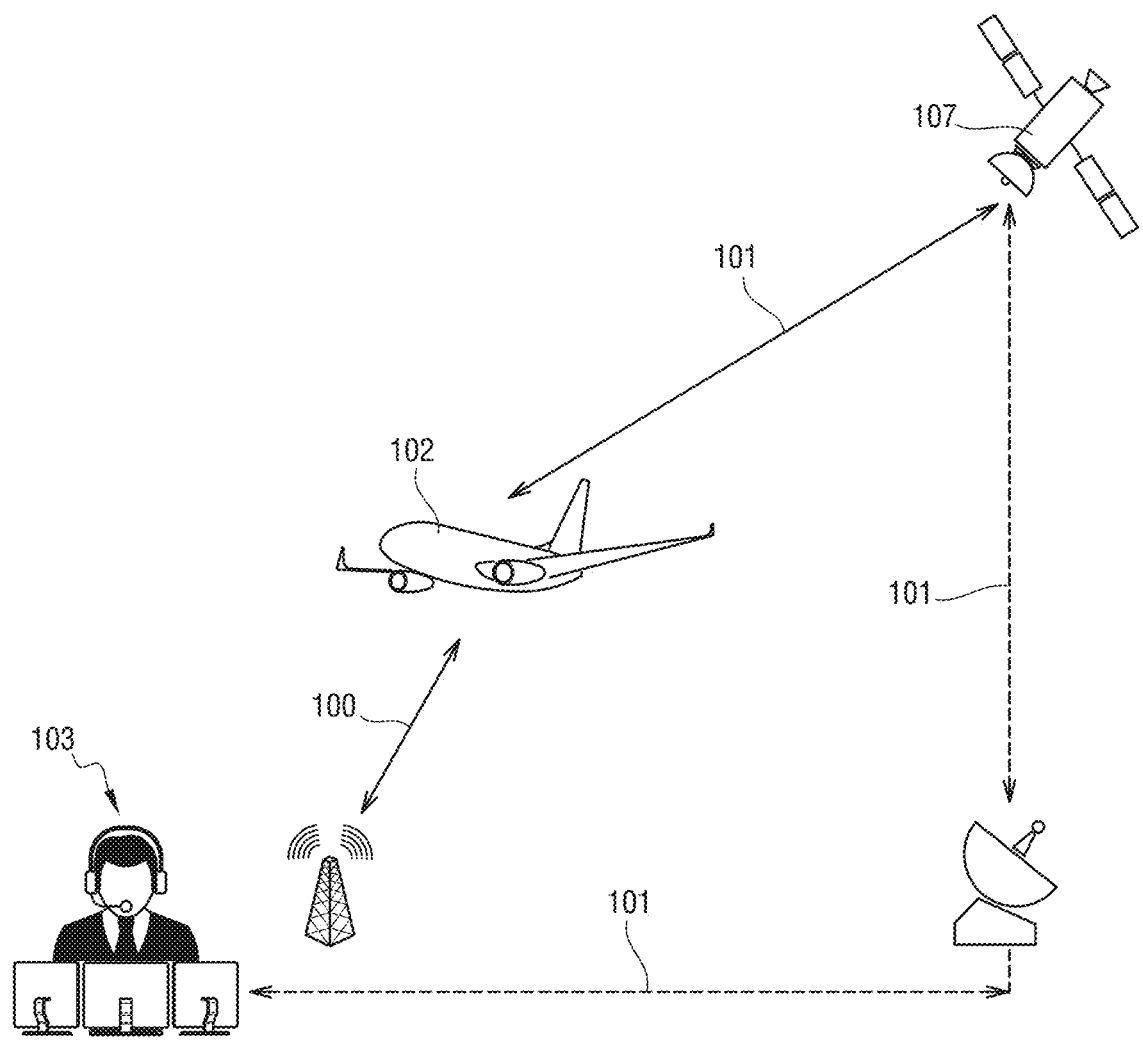
FIG. 4 represents, during the descent phase of the aircraft, the primary and secondary data link of the system C2, the primary data link being the LOS link and the secondary data link being the first BLOS link.

Then, with reference to FIG. 4, during descent, when the aircraft 102 returns to the range limit of the LOS link 100, a switch occurs: the LOS link 100 becomes the primary data link and the first BLOS link 101 (or the second BLOS link) becomes the secondary data link. This configuration is maintained during landing, taxiing to the parking lot and parking.

The alternative piloting system 1 also includes a taxiing control device 45 which includes a TAS module 46 (for Taxi Assistance System), a guidance device 47 which can use one or more camera(s) and perform image processing, and an anti-collision device 48 using for example a radar but also, potentially, a camera imaging device (day, LWIR).

The taxiing control device 45 is connected only to the main bus 25.

The taxiing control system 45 is capable of producing a ground-based aircraft piloting setpoint. The taxiing control device 45 is capable of controlling the braking of the aircraft in the event of incapacity of the pilot on board before the aircraft reaches the determined take-off speed V1 (see earlier in this description), and also allows the runway centreline to be maintained in these conditions. The taxiing control system could also perform taxiing instead of the pilot.

The alternative piloting system 1 also includes a power supply device 49 with uninterrupted power supply. The power supply device 49 is an autonomous and independent device, which supplies power to the alternative piloting system 1 even in the event of a failure affecting the aircraft power generation systems. The power supply device 49 is connected to the other devices of the alternative piloting system 1 by independent power buses.

The alternative piloting system 1 also includes an aircraft monitoring system for the aircraft 50.

The aircraft monitoring system 50 includes a display positioned in the cockpit.

The aircraft monitoring system 50 is connected to the main bus 25.

The alternative piloting system 1 also includes a pilot monitoring system 51. The pilot monitoring system 51 is used to detect that the aircraft is in the emergency situation corresponding to a failure of the pilot on board. The pilot monitoring system includes a camera that acquires images of the face, and in particular the eyes of the pilot on board.

The pilot monitoring system 51 also includes a detection system capable of detecting, in less than 2 seconds, a pilot's incapacity, thanks to biometric sensors and specific sensors.

The pilot monitoring system 51 is connected to the main bus 25.

The alternative piloting system 1 also includes a virtual co-pilot 52. The purpose of the virtual co-pilot 52 is to anticipate risk situations and warn the pilot on board in the event that such situations are likely to occur. The purpose of the virtual co-pilot 52 is also (and above all) to cross-check critical data and actions, and also to automatically perform tasks, so as to maintain an acceptable load for the pilot on board both when the aircraft is in a normal state and when an emergency situation occurs. It also has a voice interface with the pilot on board, and a visual interface. It also generates audio messages. It is composed of a state machine part, a processing module, and a Human Machine Interface (HMI) part.

The virtual co-pilot 52 is connected to the main bus 25.

The virtual co-pilot 52 has a voice assistance system.

The voice assistance system allows the pilot on board to interact vocally and exchange information with the various aircraft systems. In particular, the voice assistance system is connected to the acquisition and analysis device 30, which acts as an interface with these different systems.

Voice interaction is in both directions. The orders of the pilot on board are taken into account by the voice assistance system. The voice assistance system transmits information to the pilot on board: reading checklists and proposing actions according to predefined procedures.

The voice assistance system also makes it possible to check the actions carried out by the pilot on board and to alert the pilot on board in the event of an error.

The voice assistance system therefore assists the pilot on board in the same way as a human co-pilot. The pilot on board can thus fly the aircraft while being assisted or even supplemented to activate systems, to follow predefined procedures, etc.

The alternative piloting system 1 also includes the configuration system according to the invention 80.

The configuration system according to the invention 80 allows the aircraft to be automatically configured so that it simply, quickly but also safely and reliably switches from a configuration in which the aircraft must be piloted by two pilots on board to a configuration in which the aircraft can be piloted by a single pilot on board, and vice versa. The configuration system 80 clearly and unambiguously indicates to the single pilot on board or to both pilots on board the configuration in which the aircraft is.

The configuration system 80 therefore allows the aircraft to be configured in a mode selected from a plurality of modes including a two-pilot mode and a single-pilot mode.

The two-pilot mode is a mode in which equipment dedicated to single-pilot operation is disabled.

The dedicated equipment is equipment of the alternative piloting system 1, which includes in particular the control device 26, the acquisition and analysis device 30, the pilot monitoring device 51, the SDM module 38 and the ADT module 39 of the communication device 37.

In the two-pilot mode, the interface device 34 is forced and maintained in an operating mode in which the manual piloting setpoints produced by the pilots on board are routed to the inputs of the original systems, including the flight control computer inputs.

It should be remembered that the interface device 34 makes it possible, in particular, to connect the pilot control device 26 and the pilot controls (throttle lever 21, rudder pedals 8, trim control wheel 9, handles 17) to the original systems.

Alternatively, rather than keeping the interface device 34 in this mode of operation specific to the two-pilot mode, the procedure is as follows.

When the aircraft is to be configured in single-pilot mode, the interface device 34 is used to connect the pilot controls and the pilot device 26 to the original systems. However, when the aircraft is to be configured in the two-pilot mode, first equipment of the interface device 34 is replaced by second equipment that statically connects the pilot controls to the original systems, and thus the manual piloting setpoints produced by the pilots on board to the inputs of the original systems.

The second equipment is identical in every respect to the first equipment from an external point of view (dimensions and interface terminal block).

The replacement of this equipment is performed by an aircraft maintenance technician (or maintenance team). The intervention takes place during a maintenance phase of the aircraft, with the aircraft on the ground with the engines off.

This introduces some "hard" routings and avoids using the relays of the interface device 34 in the two-pilot mode.

In this case, two series of equipment are provided: a series of first equipment for single-pilot mode and a series of second equipment for two-pilot mode. When switching on, the maintenance technician connects to the configuration system 80 to initiate the mode change. The particularity of this solution involving equipment replacements is that the configuration system 80 also verifies that the equipment configuration is in accordance with the current mode (two pilots or one pilot).

The aircraft can thus be piloted in a conventional manner by a conventional crew comprising the two pilots on board and the automatic control system 6.

The single-pilot mode, on the other hand, is a mode in which equipment dedicated to single-pilot flight control is activated. The role of the equipment dedicated to a single-pilot flight is to assist the single pilot on board to fly the aircraft, and to allow ground-based supervision, or even remote flight control under certain conditions.

The aircraft can thus be piloted by a crew comprising the sole pilot on board, the alternative flight system 1 and its virtual co-pilot 52, the automatic control system 6 and, if necessary, the pilot on the ground and the supervisor on the ground.

The structure and operation of the configuration system according to the invention 80 is now described in greater details.

Figure 5:
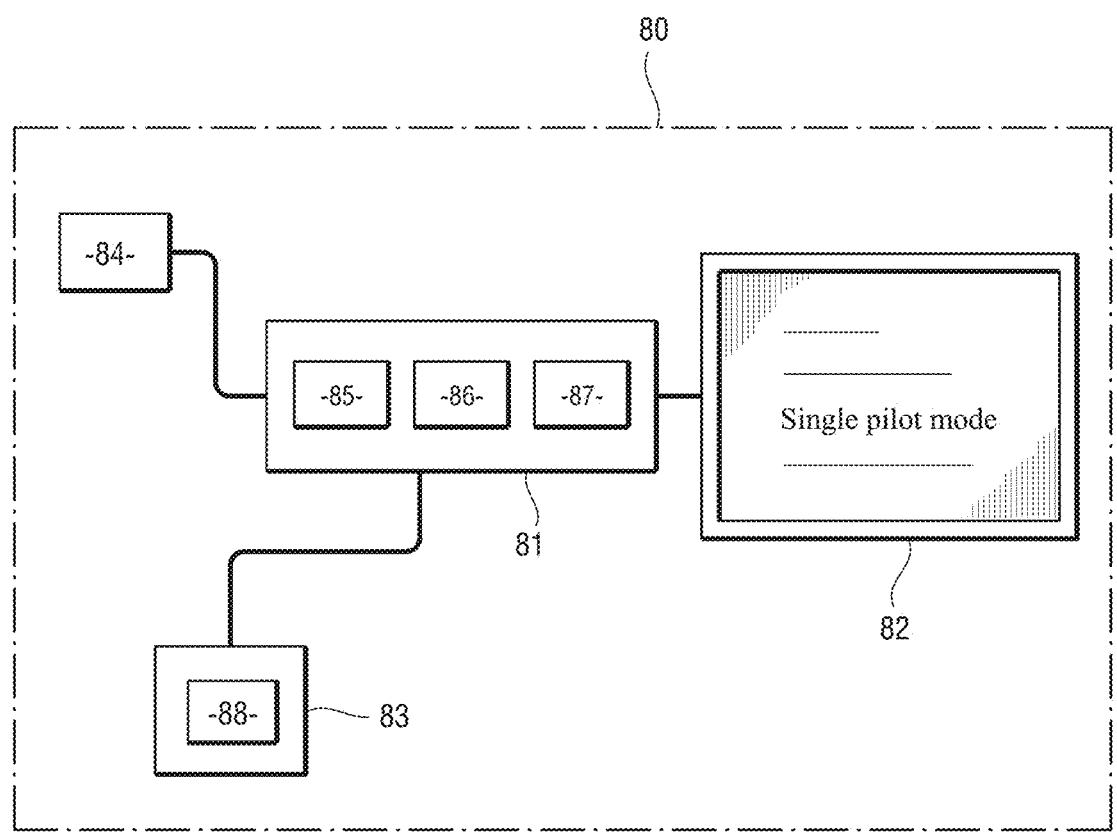
FIG. 5 is a schematic view of the configuration system according to the invention.

With reference to FIG. 5, the configuration system 80 consists of an electronic unit 81, a visual indicator 82, authentication means 83 and acquisition means 84.

The electronic unit 81 is connected to the visual indicator 82, the authentication means 83 and the acquisition means 84.

The electronic unit 81 includes first activation means 85, second activation means 86 and verification means 87.

The first activation means 85 can selectively activate or deactivate equipment dedicated to single-pilot flight. The second means activation 86 may selectively allow or prohibit the starting of aircraft engines.

The visual indicator 82 is here a screen that is positioned in the cockpit and is visible when a first pilot on board (or captain) and a second pilot on board (or co-pilot) are installed in the cockpit, by the first pilot on board and by the second pilot on board.

It should be noted that the visual indicator 82 can perfectly be an interface to the virtual co-pilot 52.

The visual indicator 82 displays the current mode in which the aircraft is configured: two-pilot mode, single-pilot mode (as well as an indication if the single-pilot mode is enabled or not).

The configuration system 80 can switch the configuration in response to a configuration order.

The author of the configuration order is a maintenance technician. The configuration order is necessarily issued during an aircraft maintenance phase, with the aircraft on the ground with the engines off.

The authentication means 83 are intended to authenticate the configuration order.

Authentication of the configuration order may consist in verifying the identity of the author of the configuration order, i.e. the maintenance technician.

The means of authentication 83 includes a reader that can identify the maintenance technician by implementing one or more of the following identification methods.

The reader can read an identification material, such as a card, in the possession of the maintenance technician.

The reader can also acquire and interpret a password entered by the maintenance technician.

The reader can also acquire and read biometric data from the maintenance technician, and compare these biometric data with reference data contained in a database to identify the maintenance technician.

The authentication means 83 can also authenticate the configuration order not by identifying the maintenance technician, but by authenticating the means used to produce the configuration order. The means can be a portable configuration device connected by the on board maintenance technician to the configuration system 80.

The authentication means 83 includes communication means arranged to establish a connection with a server on the ground. The ground server can, but not necessarily, be used to perform the authentication. The connection is made, for example, via a Gatelink type link. The connection can also be made via the communication device 37.

The acquisition means are used to acquire the configuration order issued by the maintenance technician during the maintenance phases. The acquisition means 84 include, for example, the portable configuration device mentioned above. The acquisition means may also include an interface with a maintenance system external to the aircraft. The maintenance technician can also interact with the acquisition means using a portable configuration device.

The acquisition means could also include an interface to the virtual co-pilot 52, such as a touch screen or a voice interface. The acquisition means may also include a maintenance screen or a cockpit information screen, or an interface to an electronic flight bag (EFB).

Mode management is now described at the time the aircraft is powered up.

At the time the aircraft is turned off, the configuration system 80 is also turned off.

When the aircraft is powered up, the configuration system 80 is activated.

If the configuration system 80 has been turned off while the aircraft was in two-pilot mode, the configuration system 80 does not reconfigure the aircraft that remains in two-pilot mode.

The first activation means deactivate the equipment dedicated to single-pilot operation, so that the dedicated equipment does not interfere in any way with the use of the aircraft in the two-pilot mode. In reality, the first activation means do not act at this time on the dedicated equipment, since the dedicated equipment was already inactive.

The second activation means 86 allow the aircraft engines to start. In reality, the second activation means 86 do not affect the engines, since starting the aircraft engines was not prohibited.

The configuration system 80 goes into a standby mode until the aircraft engines are switched on, or until it is called upon to change the aircraft mode (by a maintenance technician, via the acquisition means 84).

When arriving in the cockpit, the two pilots on board check that the aircraft is in the two-pilot mode using, for example, visual indicator 82 or virtual co-pilot 52 or the aircraft original electronic flight bag (EFB).

This allows the pilots on board to take off and fly the aircraft as if it were a conventional aircraft with two pilots on board.

If the configuration system 80 has been turned off while the aircraft was in single-pilot mode, the configuration system 80 restarts and reconfigures the aircraft to single-pilot mode.

The first activation means then activate the equipment dedicated to a single-pilot flight.

The verification means 87 of the electronic unit 81 verify that single-pilot flight conditions are met and inform the sole pilot on board and the ground station of the results of these checks. The pilot on board is informed of these results by the visual indicator 82.

The second activation means 86 prohibit engine starting until all single-pilot flight conditions are met.

Eventually, in an alternative embodiment, this prohibition is not physically implemented and remains procedural: in this case, no system prevents the pilot on board from starting the engines when he/she considers it appropriate (normally after checking the single-pilot flight conditions).

Single-pilot flight conditions include an operational state of the equipment required for single-pilot flight. This equipment includes equipment dedicated to single-pilot flight that is part of the alternative flight system 1, as well as original aircraft systems. A satisfactory maintenance report of the dedicated equipment is required to validate the mode. It should be noted that the verification of this condition could have been performed by the maintenance team when the aircraft was configured. If the aircraft has not been restarted, it is not necessary for the pilot on board to re-run it.

Single-pilot flight conditions also include an operational state of an aircraft data link to a ground station. The data link is in this case the data link of the system C2. The system data link C2 must be operational because, when the aircraft is piloted by a single pilot on board, the role of the ground station (and therefore of the pilot on the ground and the ground supervisor) is crucial to pilot the aircraft (e. g. in the event of a failure of the single pilot on board or an engine failure).

Verification of the system data link C2 also verifies that the system C2 as a whole is functional.

The single-pilot flight conditions may also include confirmation that the flight plan (aircraft, pilot, destination, etc.) programmed into the aircraft corresponds to a flight plan in the possession of the ground supervisor present in the ground station. The system data link C2 is used to perform this verification.

The single-pilot flight conditions may include other points that help to ensure the safety of flights in the single-pilot configuration.

The verification of these single-pilot flight conditions is triggered by the pilot on board when he/she arrives in the cockpit.

The pilot on board uses the virtual co-pilot to control the means of verification 87 and request that this verification be started. This request may be authenticated using the authentication means 83 and one or more of the described authentication methods (identification hardware support, password, biometrics).

Once all the single-pilot flight conditions have been met, the second means of activation 86 allows the engines to start.

The aircraft can then take off and be piloted by a single pilot on board. The visual indicator 82 then displays the current mode, i.e. "single-pilot mode", as shown in FIG. 5.

The configuration system 80 can also switch the configuration in response to a configuration order issued by the maintenance technician.

The configuration order defines the selected mode and controls the configuration system 80 to configure the aircraft in the selected mode.

The configuration order is acquired by the acquisition means 84 of the configuration system 80.

To be considered, the configuration order must be authenticated by the authentication means 83.

If the aircraft is in a single-pilot mode and the configuration order is an order to switch to the two-pilot mode, the configuration order is taken into account after it has been acquired and authenticated.

In this case, as has just been seen, the first activation means 85 deactivate the equipment dedicated to the single-pilot flight and the second activation means 86 authorize the starting of the engines.

Eventually, the maintenance team will also replace the first equipment of the interface device 34 with the second equipment corresponding to the two-pilot mode. All the instructions from the cockpit are then statically connected to the inputs of the original systems.

If the aircraft is in a two-pilot mode and the configuration order is an order to switch to the single-pilot mode, the configuration system 80 puts the aircraft in the single-pilot mode, and waits until the verification means 87 has verified that all single-pilot flight conditions are met. When all the single-pilot flight conditions are met, the second means of activation 86 allow the engines to start.

Eventually, the maintenance team replaces the second equipment with the first equipment of the interface device 34.

When the aircraft engines are started, the configuration system 80 switches off or in standby, so that it is only possible to re-enter the mode selection loop again after power is restored to the ground with the engines off during a maintenance phase.

It should be noted that mode changes can be accompanied by software loads in some aircraft computers.

The virtual co-pilot 52 is used to load into one or more ECU(s) of the aircraft a first software package when the configuration system 80 configures the aircraft in single-pilot mode, and a second software package when the configuration system 80 configures the aircraft in two-pilot mode.

The first and second software are stored in a library of the virtual co-pilot 52 or in a media support connected to the virtual co-pilot 52.

The virtual co-pilot 52 can be an electronic flight bag (or EFB) or a tablet.

The virtual co-pilot 52 can also be housed in an original electronic flight bag that belongs to the original systems (and therefore to the pre-existing aircraft) and is used by pilots on board the pre-existing aircraft to prepare and manage flights. This electronic flight bag is "Class 3", so the virtual co-pilot 52 has access to avionics data. To switch to the single-pilot mode, the first software can be loaded via the original electronic flight bag with authentication of the pilot on board and acknowledgement from the ground after the configuration change.

In the two-pilot mode, the original electronic flight bag retains its original avionics operation.

Figure 6:
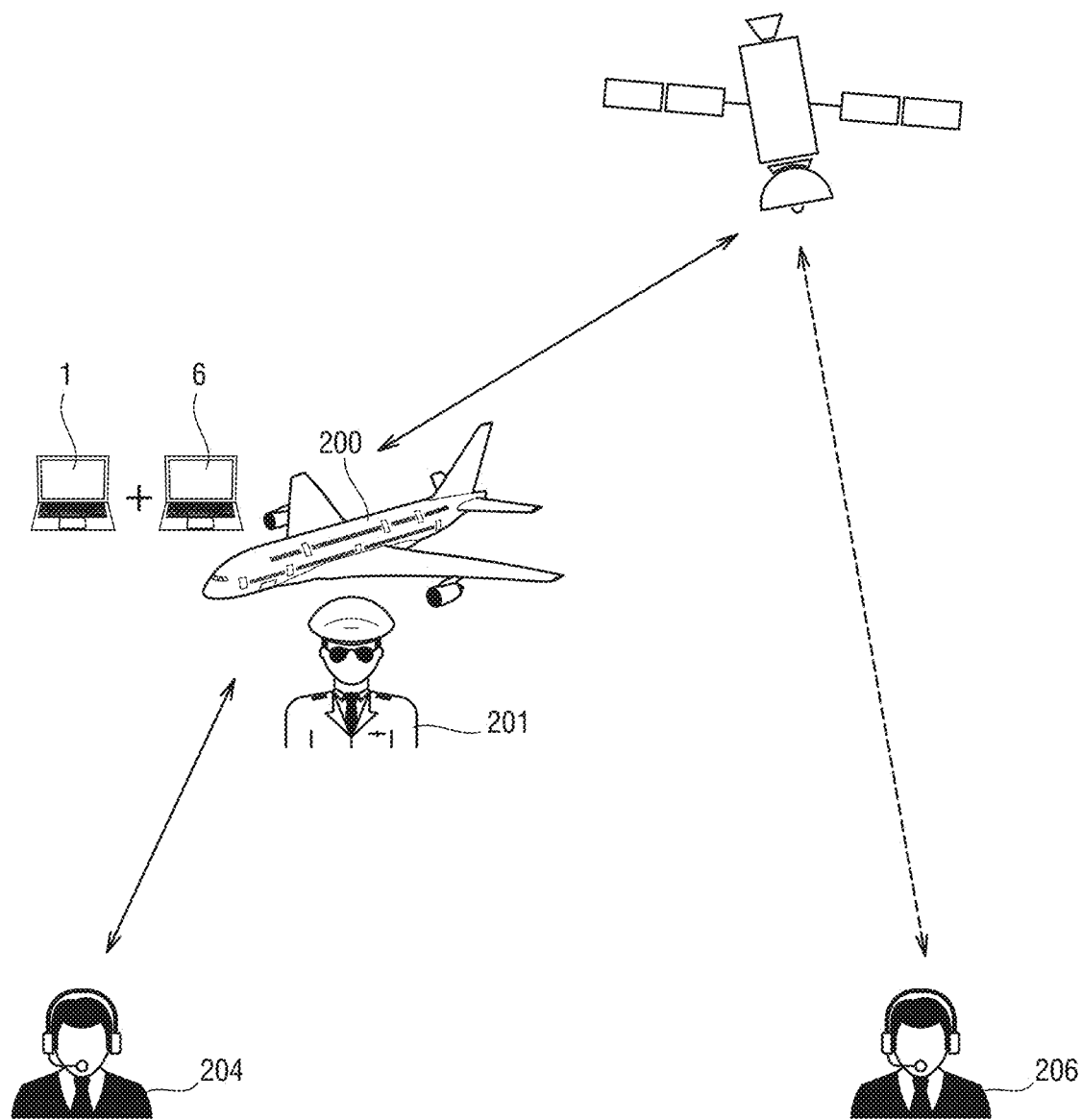
FIG. 6 represents air traffic control and the actors involved in the control of an aircraft in a normal situation, the aircraft being configured in a single-pilot mode.
Figure 7:
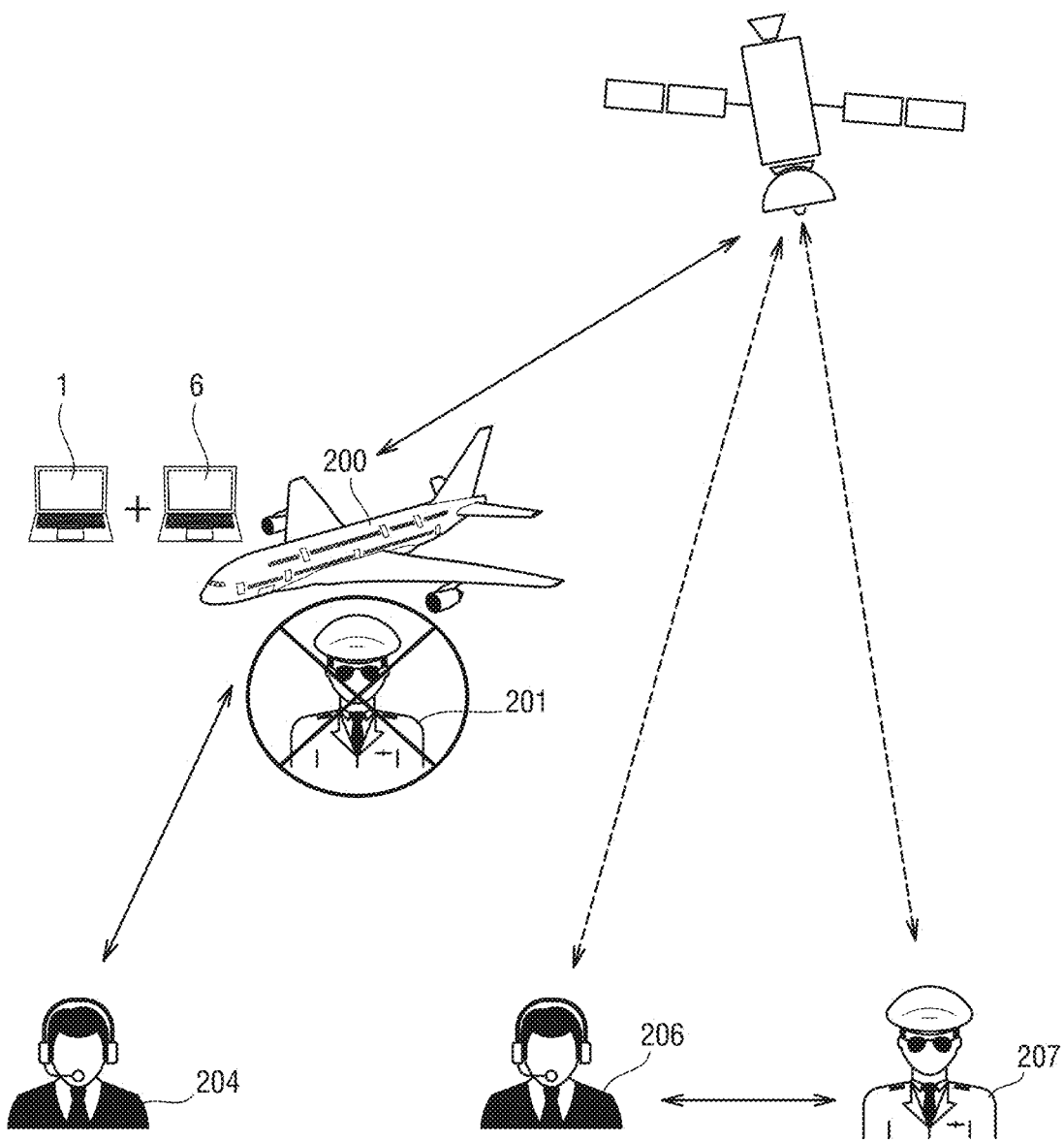
FIG. 7 represents air traffic control and the actors involved in the control of the aircraft in a transitional situation, with the aircraft configured as a single pilot mode.
Figure 8:
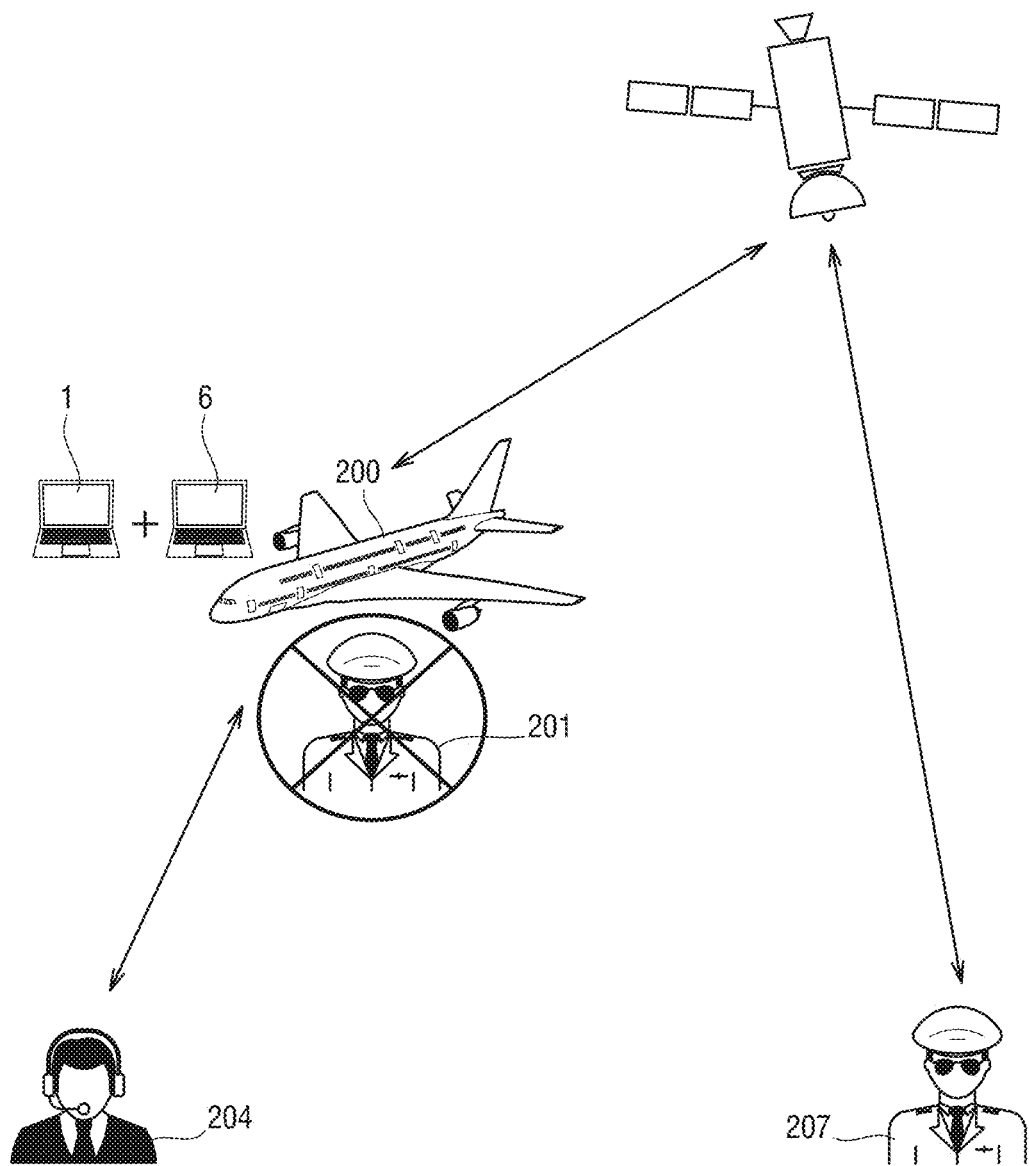
FIG. 8 represents air traffic control and the actors involved in the control of the aircraft in a situation where the pilot on board is not able to fly, the aircraft being configured in the single pilot mode.

An aircraft control method will now be disclosed in greater details while referring to FIGS. 6 to 8. This control method is implemented when the aircraft is in a single-pilot mode: a single pilot is on board in the aircraft.

New actors then intervene in the control of the aircraft. These new actors include a ground supervisor and a ground pilot.

The aircraft is likely to be piloted by a single ground pilot, who is positioned in a ground station.

The ground supervisor, on the other hand, supervises the flights of a plurality of aircrafts. The ground supervisor may be in the same ground station as the ground pilot, but not necessarily.

With reference to FIG. 6, when the aircraft 200 is in a normal state, the flight situation is a normal one: the aircraft 200 is piloted by a nominal crew consisting of the single pilot on board 201, the alternative flight system 1 and the automatic flight system 6. The pilot on board 201 also communicates with the air traffic control 204.

The alternative flight system 1 interacts with both the pilot on board 201 and the aircraft systems. The alternative piloting system 1, thanks in particular to the virtual co-pilot 202, replaces the human co-pilot.

Direct exchanges between the pilot on board 201 and the alternative flight system 1 are preferred to increase reactivity in taking into account the information exchanged.

The exchanges between the pilot on board 201 and the alternative flight system 1 are limited and normalized according to the current flight phase and the condition of the aircraft. In particular, the alternative flight system 1 only executes an order from the pilot on board 201 if it is part of an eligible list that depends on the current flight phase and the condition of the aircraft.

It should also be noted that the actions of the pilot on board 201 on the systems of the aircraft 200 are automated as much as possible. The pilot on board 201 validates all critical actions by reading back the activation state on non-critical actions.

When the pilot on board 201 issues an order to the alternative piloting system 1 via the virtual co-pilot 52, the order is reformulated by the virtual co-pilot 52 to ensure that the correct order is taken into account.

When the aircraft 200 is in the normal state, the ground pilot is not operational. A non-operational ground pilot is relieved of any flight action, but may possibly carry out an action to monitor certain parameters of the aircraft or flight.

The ground supervisor 206 can also intervene to carry out a supervisory action.

During a flight, a special emergency situation may occur that could affect the operation of the aircraft 200.

The particular emergency situation belongs to the predefined list of emergencies that was seen earlier, which includes pilot incapacity on board, malicious act by the pilot on board and engine failure.

With reference to FIG. 7, when the occurrence of the particular emergency situation is detected, this information is transmitted to the ground supervisor 206 via the system data link C2. The flight situation is then a transitional situation. Depending on the particular emergency situation, the pilot on board 201 may be completely relieved of all flight duties.

The ground supervisor 206 makes the ground pilot 207 operational: the ground supervisor 206 informs the ground pilot 207 of the situation and gives him/her the possibility to take over at least partially the flight control of the aircraft 200.

With reference to FIG. 8, the aircraft 200 is in an abnormal state. The flight situation is an abnormal situation. The aircraft 200 is piloted by an alternative crew consisting of the alternative flight system 1, the automatic control system 6 and the ground pilot 207.

The ground pilot 207 can produce an aircraft ground piloting setpoint. The ground piloting setpoint is transmitted to the aircraft 200 via the system data links C2.

The ground piloting setpoint is then acquired by the alternative piloting system 1. The acquisition and analysis device 30 selects a piloting setpoint selected from a manual piloting setpoint produced by the pilot on board, an automatic piloting setpoint produced by the automatic control system, the ground piloting setpoint produced by the ground pilot, and the alternative piloting setpoint produced by the control device 26. The interface device 34 transmits the selected flight piloting setpoint to the aircraft flight control system.

Of course, the invention is not limited to the described embodiment but encompasses any alternative solution within the scope of the invention as defined in the claims.

The invention applies to any type of aircrafts, and particularly to aircrafts in which a single pilot is likely to be present: freight aircraft piloted by a single pilot, passenger aircraft piloted by a single pilot, urban taxi piloted by a single pilot, etc.

In the operation of the configuration system 80, it has been described that the author of the configuration order is a maintenance technician or maintenance team.

The author of the configuration order could be different. The author of the configuration order could be the pilot(s) on board.

In the case where the selected mode is the two-pilot mode, it can be expected that it is necessary for each pilot on board to produce the configuration order. The configuration system 80 configures the aircraft in two-pilot mode when it acquires, via the acquisition means, and authenticates, via the authentication means 83, a first configuration order produced by the first pilot on board and defining the two-pilot mode as the selected mode, and a second configuration order produced by the second pilot on board and defining the two-pilot mode as the selected mode.

The author of the configuration order could also be a different natural person, for example the ground supervisor. The configuration order could also be produced by an artificial intelligence hosted in a ground-based server.

The configuration system 80 described here is designed to configure the aircraft in either a single-pilot or two-pilot mode.

Other modes could possibly be considered, including transitional and pre-two-pilot or single-pilot modes.

It could be considered that the situation in which the aircraft is in when the pilot mode has been selected but not all single-pilot flight conditions are met corresponds to a transitional mode. The configuration system switches the aircraft from transitional mode to the single-pilot mode when all the single-pilot flight conditions are met. In the transitional mode, the second means of activation may prevent the engines from starting.

The invention claimed is:

1. A configuration system arranged to configure an aircraft in a mode selected from a plurality of modes including a single-pilot mode, in which the aircraft can be piloted by a single pilot on board or by a single pilot on board supplemented by a ground pilot, and a two-pilot mode, in which the aircraft must be piloted by two pilots on board, the configuration system comprising:
   acquisition means and authentication means arranged respectively to acquire and then authenticate a configuration order that defines the selected mode and controls the configuration system to configure the aircraft in the selected mode;
   first activation means arranged to activate equipment dedicated to piloting by a single-pilot on board when the aircraft is configured in single-pilot mode, and to deactivate dedicated equipment when the aircraft is configured in two-pilot mode; and
   verification means arranged to, when the aircraft is configured in the single-pilot mode, verify that single-pilot flight conditions are met and inform the sole pilot on board and a ground station of the results of these checks, the single-pilot flight conditions including an operational state of the equipment dedicated to piloting by a single pilot on board.

2. The configuration system according to claim 1, the configuration system also comprising second activation means arranged to prevent engine starting when the aircraft is configured in the single-pilot mode and all single-pilot flight conditions are not met.

3. The configuration system according to claim 1, wherein the single-pilot flight conditions also comprise an operational state of a data link from the aircraft to the ground station, and a validation by the ground station of the selection of the single-pilot mode.

4. The configuration system according to claim 3, wherein the single-pilot flight conditions also include confirmation that a flight plan programmed in the aircraft corresponds to a flight plan in the possession of a ground supervisor.

5. The configuration system according to claim 1, wherein the authentication means is arranged to identify an author of the configuration order.

6. The configuration system according to claim 5, wherein the authentication means comprise a reader arranged to read an identification hardware support in the possession of the author of the configuration order and/or a password entered by the author of the configuration order and/or biometric data of the author of the configuration order.

7. The configuration system according to claim 6, wherein the authentication means includes communication means arranged to establish a connection with a ground server to perform the authentication.

8. The configuration system according to claim 5, wherein the authentication means are arranged to identify a maintenance technician who issues the configuration order during a maintenance phase in which the aircraft is on the ground and the aircraft engines are switched off.

9. The configuration system according to claim 5, wherein the authentication means are arranged to identify the pilot(s) on board.

10. The configuration system according to claim 9, wherein the configuration system is arranged to configure the aircraft in the two-pilot mode when the configuration system acquires a first configuration order produced by a first pilot on board and defining the two-pilot mode as the selected mode, and a second configuration order produced by a second pilot on board and defining the two-pilot mode as the selected mode.

11. The configuration system according to claim 1, comprising a virtual co-pilot arranged to load into an aircraft computer or computers a first software when the configuration system configures the aircraft in single-pilot mode, and a second software when the configuration system configures the aircraft in two-pilot mode.

12. An aircraft comprising original systems, integrated into the aircraft at the time of its manufacture and arranged to allow the aircraft to be flown by two pilots on board, the aircraft further comprising equipment dedicated to piloting by a single-pilot on board, and a configuration system according to claim 1, wherein the dedicated equipment and the configuration system being introduced into the aircraft after its manufacture.

13. A method of converting a pre-existing aircraft originally arranged to be piloted by two pilots on board, comprising the steps of:
   integrating into the pre-existing aircraft dedicated equipment for single-pilot flight; and
   integrating into the aircraft a configuration system according to claim 1.

14. The conversion method according to claim 13, the pre-existing aircraft having original systems including a flight control system including pilot positioned in the cockpit, the dedicated equipment including a flight control device and an interface device for connecting the flight control device and the pilot controls to the original systems, the conversion method including the steps of:
- when the aircraft is to be configured in the single-pilot mode, using the interface device to connect the pilot controls and the flight control device to the original systems; and
- when the aircraft is to be configured in the two-pilot mode, replacing in the aircraft the first equipment of the interface device with second equipment that statically connects the pilot controls to the original systems.

* * * * *